United States Patent [19]

Spearman et al.

[11] Patent Number: 5,284,997
[45] Date of Patent: Feb. 8, 1994

[54] TWO STEP FILTER AND PROCESS

[75] Inventors: Michael R. Spearman, White Bear; Eric C. Stender, Crystal; Patrick R. Spearman, Shoreview, all of Minn.

[73] Assignee: Porous Media Corporation, St. Paul, Minn.

[21] Appl. No.: 944,301

[22] Filed: Sep. 14, 1992

[51] Int. Cl.⁵ ............................... B09B 1/00
[52] U.S. Cl. ........................ 588/249; 141/99
[58] Field of Search ............... 588/249; 405/128, 129; 55/316, 318, 384.4; 241/99, 16, 19, DIG. 38

[56] References Cited

U.S. PATENT DOCUMENTS

| | | | |
|---|---|---|---|
| 3,890,123 | 6/1975 | Kuga | 55/318 |
| 4,759,508 | 7/1988 | Griffith et al. | 241/99 X |
| 4,921,512 | 5/1990 | Maryyanek et al. | 55/316 X |
| 5,022,900 | 6/1991 | Bar-Yona et al. | 55/316 |
| 5,038,815 | 8/1991 | Palmer | 55/316 X |
| 5,061,300 | 10/1991 | Alexander | 55/316 X |
| 5,092,527 | 3/1992 | Perry et al. | 241/99 X |

*Primary Examiner*—Dennis L. Taylor
*Attorney, Agent, or Firm*—Jacobson and Johnson

[57] ABSTRACT

A two-stage filtering process and a two-stage filter, with a first-stage coalescing filter separating and removing liquid paint droplets and solids from the gaseous contents of a spent aerosol container, and a second-stage filter removing the hazardous solvents from the gaseous mixture discharging from the first-stage filter.

8 Claims, 3 Drawing Sheets

TWO STEP FILTER AND PROCESS

FIELD OF THE INVENTION

This invention relates generally to filters, and, more specifically, to a two-stage capsule filter for removing the hazardous and particulate contaminate contents from a gaseous mixture in a spent aerosol container or the like.

BACKGROUND OF THE INVENTION

One of the useful items for small applications of paints and chemicals are pressurized aerosol containers. Briefly, the aerosol container contains a propellant such as butane or propane and a paint which contains solids and liquids. The liquids include hazardous solvents such as methyl ethyl ketone, acetone xylene, toluene and the like which make the proper and safe disposal of the used aerosol container difficult. That is, even though the aerosol container is spent and no longer useful, a portion of the hazardous and non-hazardous materials remains in a gaseous phase within the aerosol container. Since only a small portion of the contents is hazardous, the separation and removal of the hazardous substances for separate disposal would be environmentally beneficial.

The present invention provides a method of separating and disposing of the hazardous substances. It also provides a two-stage capsule filter which allows users of pressurized aerosol containers to separate the hazardous materials from the non-hazardous materials quickly and easily, so that he or she can safely dispose of the empty metal aerosol canister without allowing the hazardous contents of the canister to escape into the environment. The filtering is done with two filters neither of which alone could effectively remove the hazardous solvents from the gaseous mixture.

DESCRIPTION OF THE PRIOR ART

Coalescing filters are known in the art and generally comprise two different media with different sized openings. These filters force tiny droplets in the gaseous phase to contact other droplets and coalesce to a larger droplet on the downstream side of the media. Gravitational forces acting on the larger droplets allow the larger droplets to settle out of the gaseous phase.

Carbon filters are known in the art and contain activated carbon with small pores therein. Forcing fluids including both liquids or gases containing hazardous solvents and the like through the carbon allows the carbon filter to capture and retain the hazardous solvents.

A BRIEF SUMMARY OF THE INVENTION

Briefly, the invention comprises a two-stage filtering process and a two-stage capsule filter, with a first-stage coalescing filter separating and removing liquids and solids from the gaseous contents of a spent aerosol container and a second-stage filter removing the hazardous solvents from the gaseous mixture discharging from the first-stage filter.

A BRIEF DESCRIPTION OF THE DRAWINGS

DESCRIPTION OF THE PREFERRED EMBODIMENT

Figure 1:
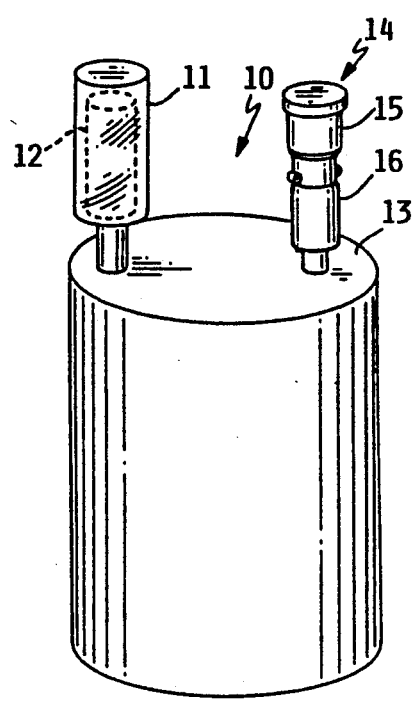
FIG. 1 shows a perspective view of a container for directing the contents of an aerosol container into a container and a two-stage capsule filter.

FIG. 1, reference numeral 10, generally identifies a closed container such as a barrel having a fluid-tight housing 11 attached thereto for inserting a spent aerosol container, and a punch (not shown) for rupturing the spent aerosol container after a lid (not shown) seals the aerosol container in housing 11. On the other side of container 13 is a two-stage capsule filter 14 with a first-stage for separating and removing suspended paint droplets from the contents of aerosol container 12, and a second-stage for removing the hazardous chemicals from the gaseous phase discharging from the first-stage filter. It should be pointed that either of the two stages used alone would be ineffective in removing the hazardous solvents. Typically, a user places aerosol container 12 in chamber 11, which is sealed, and then punctures it (by means not shown). Puncturing aerosol container 12 drains any remaining liquid in aerosol container 12 into the bottom of container 13 while the pressurized propellant and the gaseous contents of aerosol container 12 remain in the gaseous phase above the liquid in the bottom of container 13.

Figure 2:
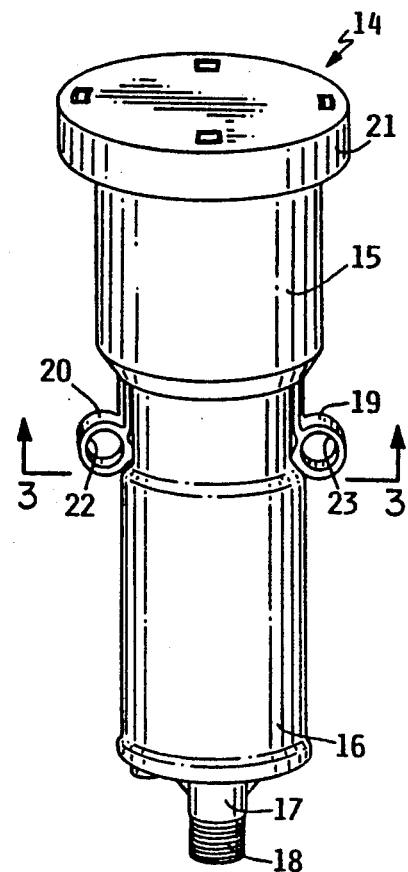
FIG. 2 shows a perspective view of the two-stage capsule filter of FIG.1.

The exterior of the two-stage capsule filter 14 shown in FIG. 2 comprises a pipe 17 with a male pipe-threaded section 18 for threading into a female threaded bung-hole in barrel 13. Pipe 17 extends into the housing of first-stage filter 16. On top of first-stage filter 16 is a detachable second-stage filter 15 which resilient latch members 20 and 19 mount to first-stage filter 16. Latch members 20 and 19 have finger grips 22 and 23. A rain cap 21 on top of second-stage filter 15 allows non-hazardous gases to escape from it while preventing rain from entering capsule filter 14.

Figure 3:
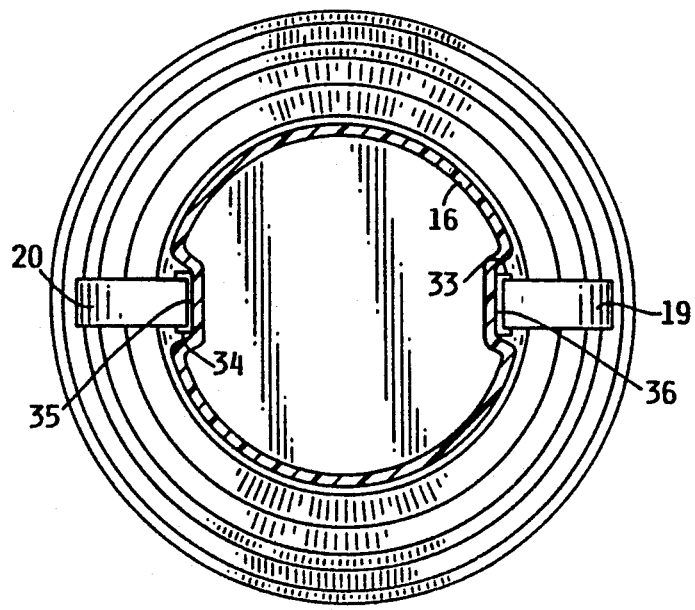
FIG. 3 shows a sectional view taken along lines 3—3 of FIG. 2.

FIG. 3 shows a cross-sectional view taken along lines 3—3 of FIG. 2 to illustrate the engagement of spring-latch 19 with a protruding lip 33 on one side of capsule filter 14 and the engagement of spring-latch 20 with a protruding lip 34 on the other side of capsule filter 14. The protruding lips 33 and 34 and latches 19 and 20 are respectively in recesses 35 and 36 in the housing of first-stage filter 16. The purpose of recesses 36 and 35 is to prevent rotation of second-stage filter 15 with respect to first-stage filter 16.

Figure 4:
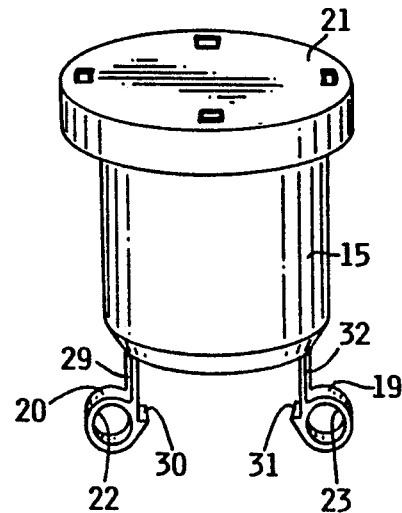
FIG. 4 shows a perspective view of the second-stage filter of the two-stage capsule filter of FIG. 2.

FIG. 4 shows the second-stage filter 15 to illustrate the resilient legs 29 and 32 on latch members 19 and 20, as well as latch members 30 and 31, which permit engagement and disengagement with lips 33 and 34 on the housing of first-stage filter 16. The purpose of having a latch for connecting together the two filters is so that if the carbon filter which retains the hazardous solvents becomes filled a new carbon filter can be quickly attached to the first stage filter.

Figure 5:
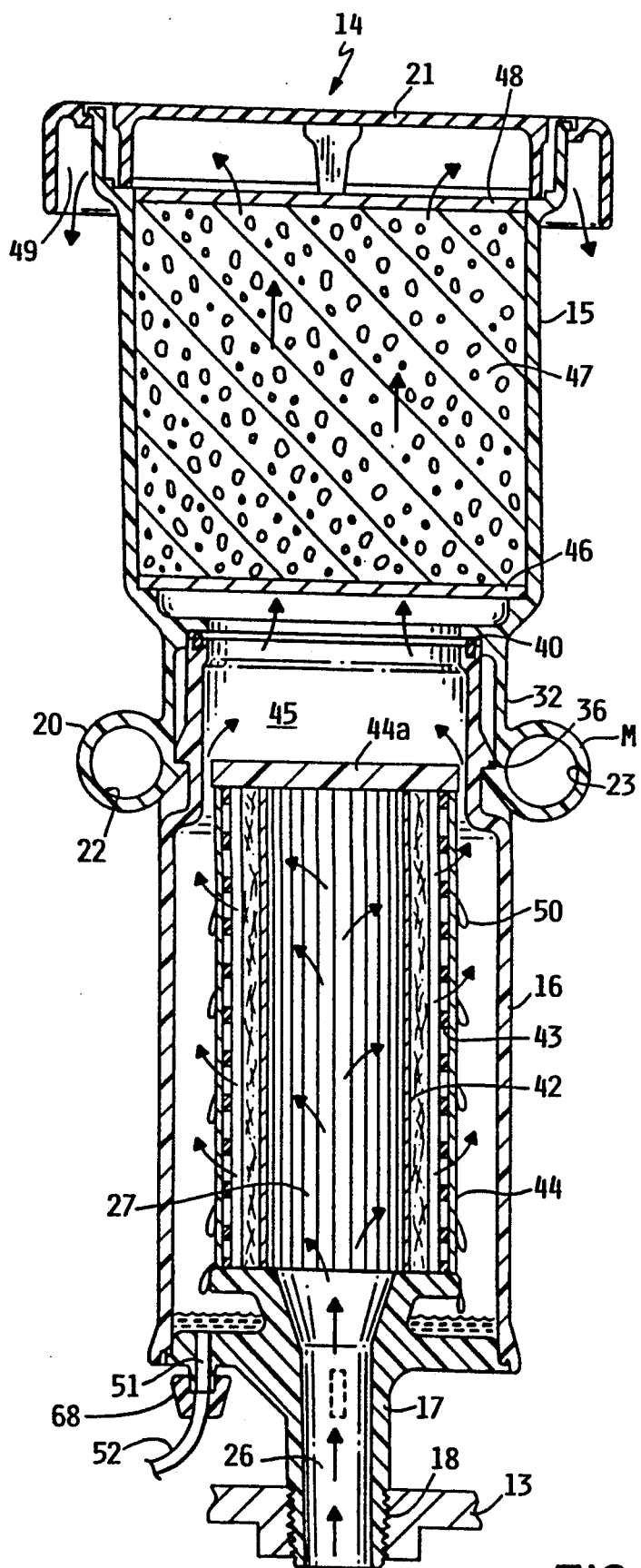
FIG. 5 shows a cross-sectional view of the two-stage capsule filter of the present invention.

To understand the operation of the two-stage capsule filter in separating and removing selected hazardous materials from the contents of a spent aerosol container, refer to FIG. 5. Typically, the contents of the aerosol container include a propellant, such as butane or propane; a liquid, such as paint; and a hazardous paint solvent, such as methyl ethyl ketone, acetone, xylene, toluene or ketones. Typically the hazardous solvents are in a gaseous mixture within the aerosol container. To dispose of the aerosol container requires removal of the hazardous solvents. The difficulty in disposing of and separating the hazardous materials by using only carbon filters is that the gaseous phase includes small paint droplets which rapidly plug the carbon filters. Gravitational separation or carbon filters are unable to separate much of the dispersed and suspended small paint droplets in the gaseous mixture.

Thus, the present invention allows one to separate and remove the hazardous contents from a gaseous mixture through the use of a two-stage filter without clogging the filter. For example, the use of a carbon filter only to remove hazardous solvents from a gaseous mixture containing tiny suspended paint droplets is ineffective since it would require extensive carbon material, because the small passages in the carbon filter would quickly clog as the carbon filter contacts and removes paint droplets. However, the first-stage coalescing filter operates by coalescing the small paint droplets into larger paint droplets for gravitational separation from the gaseous mixture without clogging the coalescing filter. The coalescing filter allows the droplets to pass through the filter without retaining them while the gravitational forces drain the coalesced and larger paint droplets from the coalescing filter. The result is a gaseous mixture substantially free of filter-clogging particles yet still containing the hazardous solvents which the second-stage carbon filter can now remove. Thus, the removal of the paint droplets in the first stage, which would clog the second-stage filter, allows the second-stage filter to remove the hazardous solvents from the gaseous mixture. To prevent escape of gases from the first stage to the second stage filter a sealing ring 40 forms a fluid tight seal between first stage 16 and second stage 15 as well as between housing 60 and second stage 15.

The present invention provides a process for separating the contents of the aerosol container into liquids and gases for disposal of the hazardous solvents without damage to the environment. FIG. 5 is a cross-sectional view of the two-stage capsule filter. Reference numeral 13 identifies the top portion of container 13 of FIG. 1, with pipe threads 18 secured to the container bunghole threads in a fluid-tight relationship. A fluid passage 26 directs the gaseous mixture of paint droplets including hazardous solvents into a central chamber 27 of the first-stage of the two-stage capsule filter in housing 16.

Briefly, first-stage filter 16 comprises a coalescing filter in which the small liquid droplets in the gaseous mixture combine to form larger droplets which are of sufficient size to gravitationally drain away. Coalescing filter 16 includes a cylindrical inner coalescing filter member 42, a cylindrical support screen 43, an outer cylindrical coalescing filter media 44 forming a drain layer with a solid end cap 44a located on top of filter media 44. The purpose of the coalescing filter in the first stage of the present invention is to force the tiny liquid paint droplets in the gaseous mixture to contact one another and to gradually increase in size. Then, the enlarged droplets discharge through the outer surface of member 44, and adhere to one another, forming sufficiently large sized droplets 50 which fall down to a bottom drain outlet 51 where the liquid drains to a container through a drain pipe 52. The pressure of the gas in aerosol container forces the gaseous mixture upward through the first-stage filter as indicated by arrows. After coalescing and removing the liquid paint droplets from the gaseous mixture, which still contains the hazardous solvents, the gaseous mixture flows upward into a chamber 45 above top 44a of first-stage filter. The gaseous mixture then flows through a porous support member 46 which holds the second-stage filter material 47 therein.

Typically, the second-stage filter material comprises carbon held between a porous top filter member 48, which prevents dust from getting in the filter and a porous bottom support member 46. As the gaseous mixture flows through the second-stage filter, the carbon filter removes the hazardous solvents in the gaseous mixture, thereby allowing propellant gases striped of hazardous solvents to discharge into the atmosphere through the annular discharge passage 49 in rain cap 21. Thus, the carbon filter 49 removes hazardous solvents from the gaseous mixture by retaining them in the pores within the carbon filter, while the coalescing filter separates the paint droplets to facilitate removal of the hazardous solvents by the carbon filter.

In summary, the present invention allows one to use two filters, neither of which would be effective to remove the hazardous solvents from the gaseous mixture in the aerosol container, in series to remove the hazardous solvents in the gaseous mixture containing paint droplets.

Figure 6:
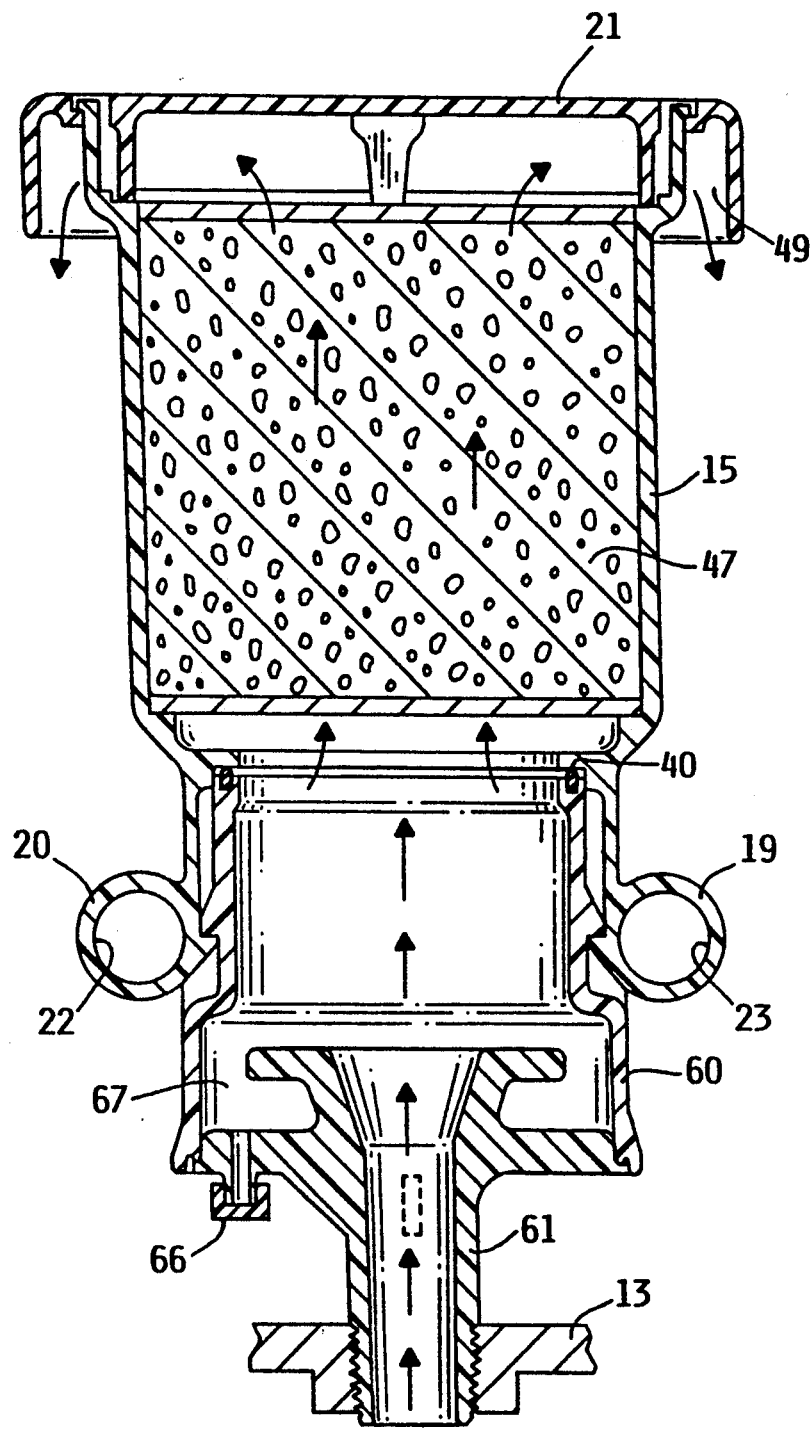
FIG. 6 shows a single-stage filter.

FIG. 6 is an alternate embodiment of the invention for use as a vent-valve filter to accommodate contraction and expansion of the gaseous mixture in the container which stores the contents of container 13. The vent-valve filter comprises only the second-stage carbon filter which is attached to a housing 60 that mounts in the bunghole of barrel 13. The purpose of the vent-valve filter shown in FIG. 6 is to remove any hazardous solvents released from container 13 as the gas in the container expands or contracts during storage. As the gas expands, if the gaseous mixture in the container contains any hazardous solvents they must pass through filter 47. Since the remaining gases contain relatively small amounts of paint droplets, maintaining a separating, coalescing filter in the first-stage is unnecessary. Consequently, the use of the second-stage filter alone provides a vent for removing remaining hazardous solvents during expansion and contraction of the gaseous material during storage.

We claim:

1. A two-stage capsule filter for separating contaminants including suspended paint droplets and hazardous paint solvent from a gaseous propellant located in an aerosol container comprising;

a first filter housing, said first filter housing having fastening means to connect to a container for receiving unseparated contents of the ruptured aerosol container;

a first stage coalescing filter in said first filter housing, said coalescing filter having a coalescing filter medium for separating out liquid paint droplets from the gaseous propellant of the ruptured aerosol container by coalescing the suspended paint droplets from the ruptured aerosol container into larger droplets that can be gravitationally drained away while permitting passage of the hazardous paint solvent and propellant therethrough;

inlet means in said first filter housing for directing the unseparated gaseous contents of the ruptured aerosol container directly into said coalescing filter;

a first fluid passage in said first filter housing for directing coalesced liquid from the contents of the aerosol container away from said first filter housing;

a second filter housing;

a second fluid passage in said first filter housing for directing the propellant and hazardous solvents of said ruptured aerosol container into the second filter housing;

a second stage filter located in said second filter housing for removing the hazardous solvent from the propellant of said aerosol container, said second stage filter normally clogging if simultaneously exposed to the suspended paint droplets and the hazardous paint solvent, said second filter housing removably attached to said first filter housing so that said second stage filter can be replaced without having to replace said first stage coalescing filter.

2. The two-stage capsule filter of claim 1 including resilient latch members for removably securing said second filter housing from said first filter housing so that said second stage filter can be removed without removing the first stage filter.

3. The two-stage capsule filter of claim 2 wherein said resilient latch members include finger grips for spreading said latch members to remove said second filter housing from said first filter housing.

4. The two-stage capsule filter of claim 3 wherein the second stage filter comprises carbon particles maintained directly above said first stage filter and said carbon filter is characterized by being prone to plugging when exposed to liquids containing the paint droplets.

5. The two-stage capsule filter of claim 4 wherein the coalescing filter includes a first cylindrical filter medium spaced inside a second filter medium having an outer surface for gravitationally draining away coalesced liquid droplets.

6. The two-stage capsule filter of claim 5 wherein the second filter housing is disconnectable from the first housing with the coalescing filter.

7. A process for separating the contents of a disposable aerosol container into portions that can be filtered through a carbon filter and into portions that can not be filtered through a carbon filter comprising:

rupturing an aerosol container containing liquids, suspended liquid droplets and a gaseous propellant;

utilizing the pressure of the gaseous propellant in the aerosol container to direct the liquids the suspended liquid droplets and the gaseous propellant into a closed container;

directing the liquids in said aerosol container into the bottom of the container through coalescing of the liquid droplets into liquid to separate the liquid droplets from the gaseous propellant through gravitational action on the liquid;

utilizing the pressure of the gaseous propellant in the aerosol container to direct the remaining gaseous mixture of the aerosol container carrying the liquid droplets and hazardous solvents into a first filter to remove droplets that normally clog a carbon filter from the gaseous propellant of the aerosol container; and passing the remaining portion of the contents of the aerosol container through a second filter to remove the unwanted hazardous solvents from the remaining gaseous mixture.

8. The process of claim 7 wherein the aerosol container contains spray paint with paint solvents located in the gaseous mixture and the aerosol container and the unwanted materials removed in the second filter are paint solvents.

* * * * *